United States Patent
Chiang

(10) Patent No.: US 6,619,809 B2
(45) Date of Patent: Sep. 16, 2003

(54) ORIENTATION-ADJUSTING DEVICE FOR VEHICLE HEAD LIGHT

(75) Inventor: Zu-Yu Chiang, Taipei (TW)

(73) Assignee: Ekpac Taiwan, Ltd., Taipei (TW)

( * ) Notice: Subject to any disclaimer, the term of this patent is extended or adjusted under 35 U.S.C. 154(b) by 0 days.

(21) Appl. No.: 09/974,867

(22) Filed: Oct. 12, 2001

(65) Prior Publication Data

US 2002/0044440 A1 Apr. 18, 2002

(30) Foreign Application Priority Data

Oct. 13, 2000 (TW) ...................................... 89217896 U

(51) Int. Cl.⁷ ............................................... B60Q 1/064
(52) U.S. Cl. .............................. 362/37; 362/56; 362/57; 362/487; 362/523; 362/524; 362/287; 362/273; 362/428; 362/425
(58) Field of Search .............................. 362/37, 56, 57, 362/487, 524, 523, 273, 289, 428, 422, 425, 267; 74/89.23, 89.33, 89.37, 89.4, 89.41

(56) References Cited

U.S. PATENT DOCUMENTS 5,355,287 A * 10/1994 Denley ........................ 362/524
6,082,882 A * 7/2000 Akiyama et al. ............. 362/524

\* cited by examiner

Primary Examiner—Sandra O'Shea
Assistant Examiner—Bertrand Zéade
(74) Attorney, Agent, or Firm—Shoemaker and Mattare

(57) ABSTRACT

An orientation-adjusting device for a vehicle head light comprises a housing encasement, an active unit, a driven unit, a cover, and driven screw rod, an elastic unit, and an elastic sealing unit. The housing encasement is installed with an elliptical hole and an axial hole. The active unit has an axial portion axially installed to the axial hole, and a gear portion located in the housing encasement. The driven unit is installed with a gear portion engaged with the gear portion of the action unit, and an axially-formed penetrating hole, which includes a threaded hole section near the active unit and a threadless hole section remotely away from the active unit. The cover is installed on the housing encasement to cover the interior of the housing encasement for preventing the driven unit from projecting out from the housing encasement. One end of the driven screw rod is screwed to a threaded section connected to the threaded hole section of the driven unit, and another end thereof is formed with an elliptical cross section passing through the elliptical hole of the housing encasement and connected with the vehicle illuminator; whereas a circular protrusion is formed at a root portion of the elliptical cross section, and a threadless cylindrical section 13 formed between the circular protrusion and the threaded section. The elastic unit is installed between the circular protrusion of the driven screw rod and the driven unit for over-rotating the active unit. The elastic sealing unit is installed between the circular protrusion of the driven screw rod and the elliptical hole of the housing encasement, and prevents gas from passing through the elliptical hole. When the active unit is over-rotated along a direction so that the threaded section of the driven screw rod is separated from the threaded hole of the driven unit, the elastic sealing unit provides an elastic force for re-screwing and combining the threaded section of the driven screw rod with the threaded hole of the driven unit.

11 Claims, 6 Drawing Sheets

ID-ADJUSTING DEVICE FOR
VEHICLE HEAD LIGHT

BACKGROUND OF THE INVENTION

1. Field of the Invention

The present invention relates to an orientation-adjusting devices for vehicle head lights, and especially to an orientation-adjusting device for adjusting the projecting angle of a vehicle head light.

2. Description of Related Art

Referring to FIG. 1, a perspective view of a head light 900 generally used in a car is illustrated. The head light assembly 900 is an integrally-formed housing encasement 910 with a main light 920 and an indicator 930 installed therein. The main light 920 has a reflecting mask 922 which can be adjusted leftwards, rightwards, upwards or backwards. Furthermore, two mounting holes 912 as shown in FIG. 2 are formed at a rear lateral side of the housing encasement 910. The reflecting mask 922 in the housing encasement 910 is formed with a buckling hole 924 corresponding with respect to the mounting hole 912.

In a prior art, Taiwanese Utility Model Application No. 89214252 filed by the inventor of the present invention, an adjuster for adjusting the orientation of the reflecting mask 922 of the head light assembly 900 of a car is disclosed. However, in practical production and applications, it has been discovered that there are a couple of defects in the orientation adjuster as described in the following:

When an active unit 20 is rotated through an angle until the front end of a driven screw rod 30 can not be further retracted, i.e., when the rear end surface of a circular protrusion 32 of the driven screw rod 30 resists against the front end surface of a driven unit 40, as shown in FIG. 3, it is possible that a vertical portion 54 of a cover 50 will be damaged once the driving member 20 is subject to over-rotation; the torque of the rotated active unit 200 that causes the damage is a destructive one. Similarly, when the active unit 20 is rotated along a reverse direction, until the front end of the driven screw rod 30 can not be moved forward any further (i.e. when the front end of the circular protrusion 32 of the driven screw rod 30 withstands the inner wall of a housing unit 10), it is possible that the driven screw rod 30 will be destroyed once the driving member 20 is subject to over-rotation. In such a situation, the torque of the active unit 20 that causes the damage is generally referred to as a destructive one.

In fact, not only the orientation adjuster has the foregoing problem, but also a general orientation adjuster suffers the same problem. Therefore, the specification of the general adjuster must list the value of the break in torque and break out torque to act as a reminder to the user from applying too much twisting force thereto. Moreover, the adjusters must be designed to tolerate up to the break in torque and break out torque. For the adjuster of the prior art, in order that the vertical portion 54 of the cover 50 and the driven screw rod 30 must be tolerate up to the destructive torque, it is required to enlarge the thickness of the vertical portion 54 and the diameter of the driven screw rod 30. It increases not only the cost of materials, but also the volume of the orientation adjuster.

In the aforesaid head light assembly 900, other than the mounting hole 912, the housing encasement 910 is a closed structure without any slit. Therefore, when the adjuster device of the prior art is being mounted in position by first passing a cylindrical portion 11 with a buckling protrusion 13 through the mounting hole 912, then at the time of compressing an elastic pad 12, buckling a buckle 33 of the driven screw rod 30 into the buckling hole 924, and finally rotating the whole adjuster until it reaches the predetermined position the housing encasement 910 becomes air-tight to prevent vapor from entering into the housing encasement 910 and thus keep mist from being formed therewithin, which impels light to emit out, and further preventing bulbs of the main light 920 and the indicator 930 from being damaged by humidity.

In the head light assembly 900 with the aforesaid structure, when the driving member 20 is over-rotated in one direction, the over-retracted buckle 33 would possibly destroy the buckling hole 924 and break the reflecting mask 922. Similarly, when the driving member 20 is over-rotated in the other direction, the reflector 922 may be damaged by the over-inserted buckle 33. In the above situations, since the housing encasement 910 is a closed structure and the reflector 922 cannot be replaced, the whole of head light assembly 900 must be replaced as a whole. In other words, when the conventional orientation adjuster is damaged by screw-in or screw-out destroyed, not only the adjuster itself is destroyed, the whole lamp assembly is ruined.

As described above, when the head light assembly 900 is mounted with the orientation adjuster of the prior art, the housing encasement 910 must be completely air-tight. However, in the orientation adjuster of the prior art, the driven screw rod 30 is installed and screwed to the first hole 14 of the cylindrical portion 11, and thus the screwing structure cannot satisfactorily assure the air tightness of the housing 910. Therefore, vapor might be allowed to enter into the housing encasement 910, and thus, the interior of the housing encasement 910 is easy to have mist formed therein, and the main light 920 or the indicator 930 is easily damaged by moisture.

In addition, the conventional adjuster has the same defects. In order to assure the airtightness, there are conventional orientation adjusters equipped with sealing rubber at its front-most end (not shown). However, as the interior of the head light assembly 900 is often at a high temperature due to heat generated by the bulbs, the rubber exposed to such a high temperature is easily worn and needs to be often replaced.

In the orientation adjuster of the prior art, a threaded section 31 of the driven screw rod 30 must be screwed to the elliptical hole 14 of the cylindrical section 1, and therefore, the length of the threaded section 31 must be approximately equal to twice the length of the hole 14. This limits the further reduction of the volume of the orientation adjuster.

SUMMARY OF THE INVENTION

The present invention is accomplished in order to improve the defects disclosed in the prior art. It is therefore an object of the present invention, to provide an orientation adjusting device for a vehicle head light without the confinement of the destructive torque, so that no damage to the orientation adjusting device will occur even if it is over-rotated.

It is another object of the present invention to provide an orientation-adjusting device for a vehicle head light that the airtightness can be satisfactorily achieved.

A further object of the present invention is to provide an orientation-adjusting device for a vehicle head light that can be used with a longer lifetime.

It is still another object of the present invention to provide an orientation-adjusting device for a vehicle head light with a reduced volume.

To achieve the above objectives, the present invention provides an orientation-adjusting device for a vehicle head light comprising a housing encasement, an active unit, a driven unit, a cover, driven screw rod, an elastic unit, and an elastic sealing unit. The housing encasement is installed with an elliptical hole and an axial hole. The active unit has an axial portion axially installed at the axial hole and a gear portion located in the housing encasement. The driven unit has another gear portion engaged with the gear portion of the active unit, and an axially-formed penetrating hole, wherein the penetrating hole includes a threaded hole section near the active unit and a threadless hole section remotely away from the active unit. The cover is installed on the housing encasement to cover the interior thereof and prevent the driven unit from projecting out therefrom. The driven screw rod has one end formed with a threaded section screwed to the threaded hole section of the driven unit, and the other end formed with an elliptical cross section which is capable of protruding out of the elliptical hole of the housing encasement where it is connected with the car illuminator, wherein the base portion of the elliptical cross section is formed with a circular protrusion, and a threadless cylindrical section is formed between the circular protrusion and the threaded section. The elastic unit is installed between the circular protrusion of the driven screw rod and the driven unit. When the active unit is over-rotated in one direction so that the threaded section of the driven screw rod and the threaded hole section of the driven unit, due to the threaded hole section of the driven unit, are completely inserted in the cylindrical section of the driven screw rod; and when the threaded section of the driven screw rod is completely inserted into the threadless hole section of the driven unit and falls therefrom; the elastic unit praides and elastic force for re-screwing the threaded section of the driven screw rod to the threaded hole section of the driven unit as the active unit is roated in a reverse direction. The elastic sealing unit is installed between the circular protrusion of the driven screw rod and the elliptical hole of the housing for preventing gas from passing through the elliptical hole. When the active unit is over-rotated along a direction so that the threaded section of the driven screw rod is separated from the threaded hole section of the driven unit, the elastic sealing unit provides an elastic force for re-screwing the threaded section of the driven screw rod to the threaded hole section of the driven unit.

The various objects and advantages of the present invention can be fully understood by reading the following detailed description with reference made to the accompanying drawings, but the present invention is not understood to be limited by them.

DETAILED DESCRIPTION OF PREFERRED EMBODIMENTS

Figure 1:
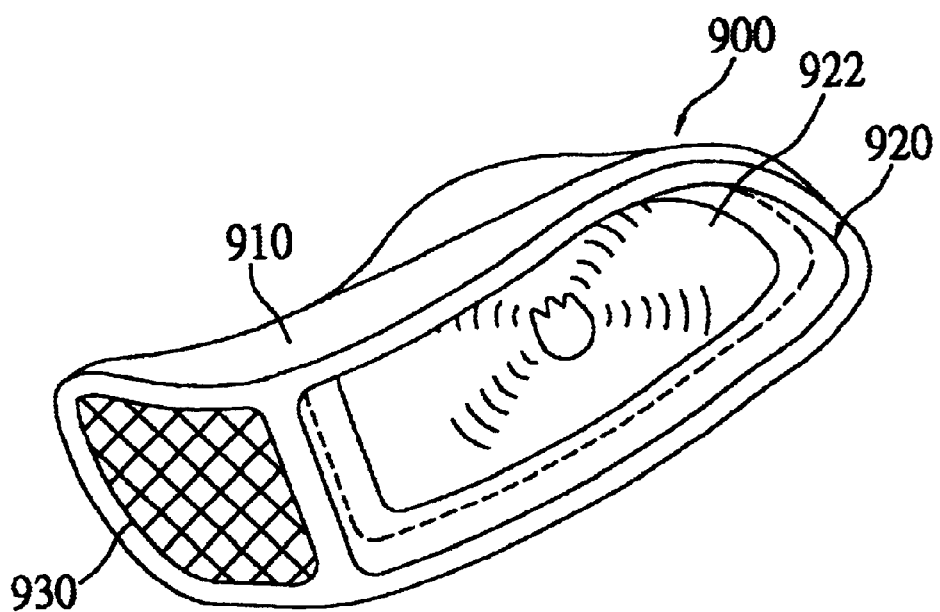
FIG. 1 is a schematic perspective view of a conventional lamp assembly of a car.
Figure 2:
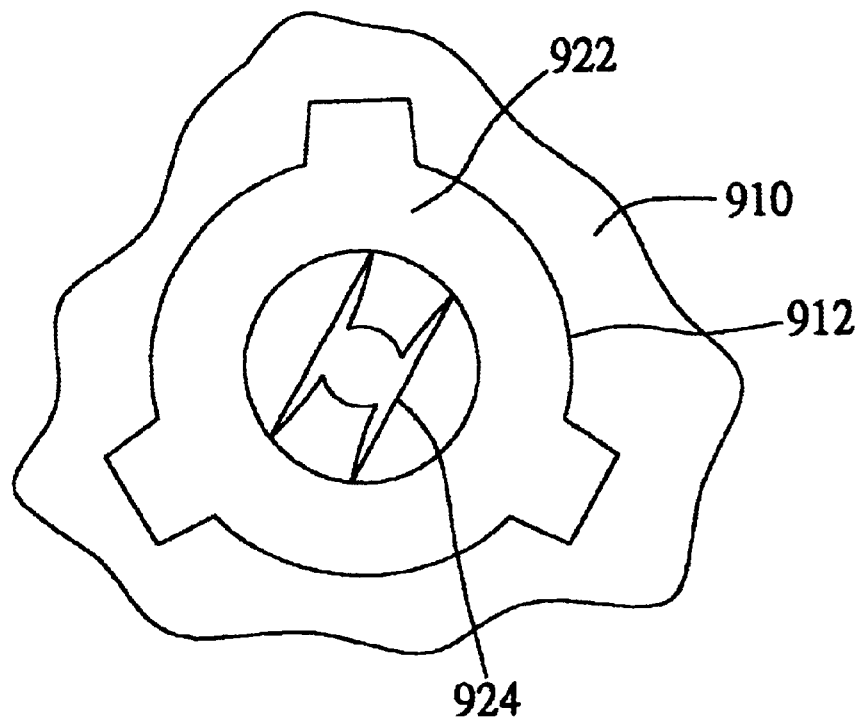
FIG. 2 is a partial rear view of the lamp assembly of FIG. 1.
Figure 3:
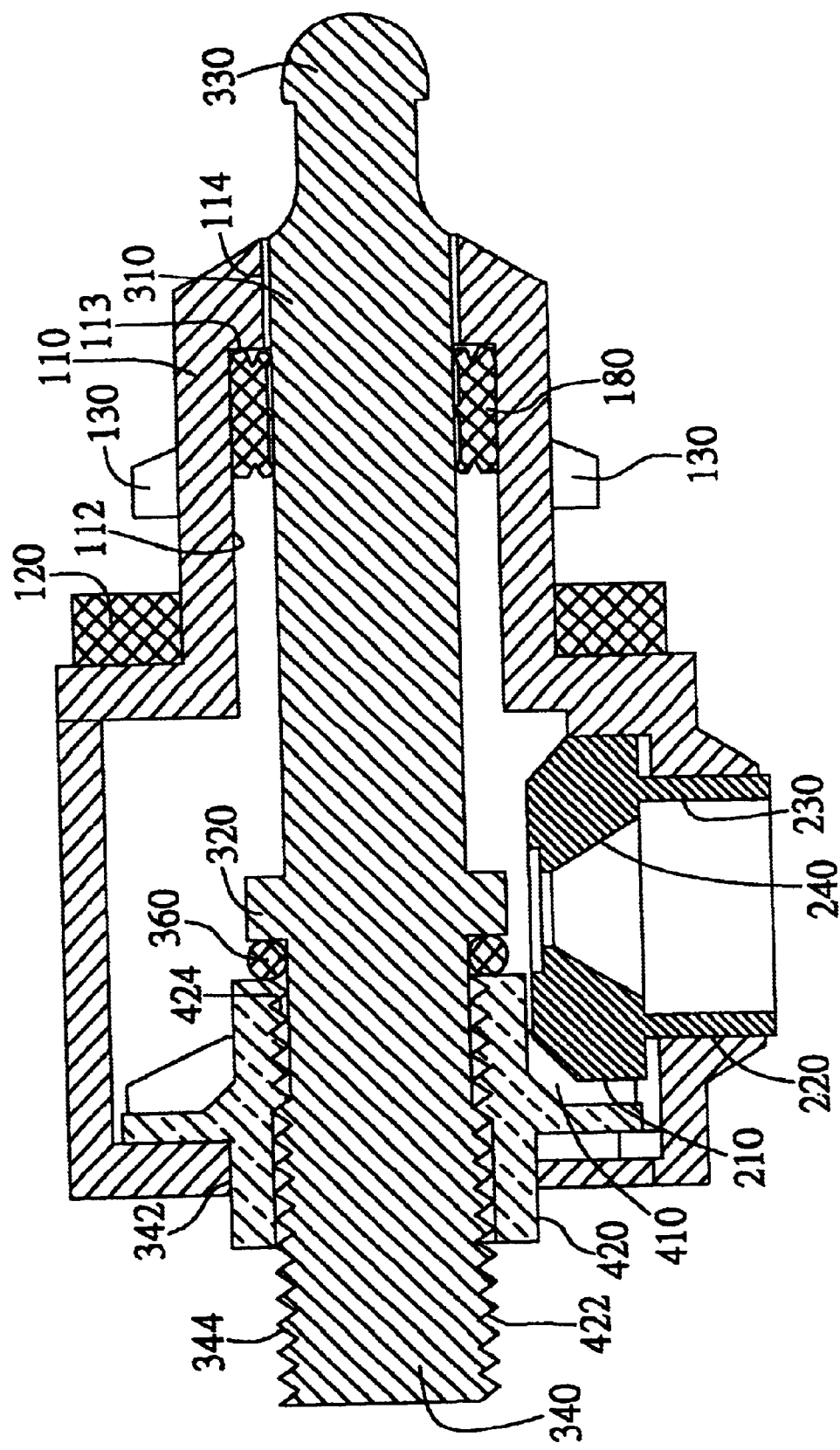
FIG. 3 is a sectional view showing that the orientation-adjusting device for a vehicle head light of the present invention is in a "travel-out" condition

Referring to FIG. 3, a cross sectional view showing the orientation-adjusting device for a vehicle head light of the present invention in a "travel-out" condition is illustrated. Further referring to FIG. 4, a cross sectional view showing the orientation-adjusting device for a vehicle head light in a "travel-in" condition is illustrated. Further referring to FIG. 5, a dissecting stereogram showing the orientation-adjusting device for a vehicle head light according to the present invention is illustrated. Further referring to FIG. 6A, a front view of the active unit of FIG. 5 is shown; and with reference to FIG. 6B, an vertical view of the active unit of FIG. 5 is shown. A preferred embodiment of the orientation-adjusting device for a vehicle head light of the present invention will be described in the following with reference to FIGS. 3 to 6.

As shown in the drawings, the orientation-adjusting device for a vehicle head light of the present invention comprises a housing encasement 100, an active unit 200, a driven screw rod 300, a driven unit 400 and a cover 500.

Figure 4:
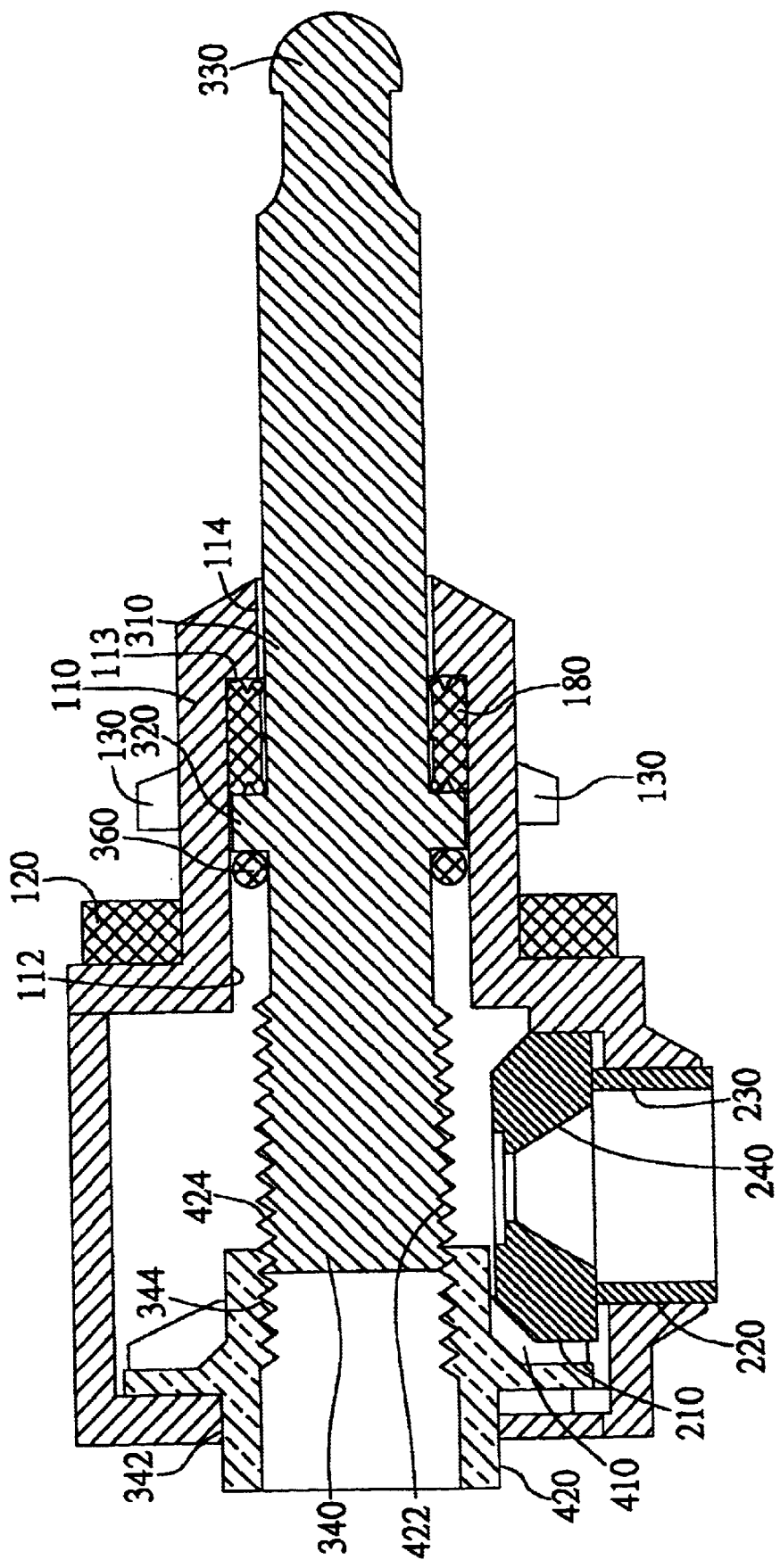
FIG. 4 is a sectional view showing that the orientation-adjusting device for a vehicle head light is in a "travel-in" condition
Figure 5:
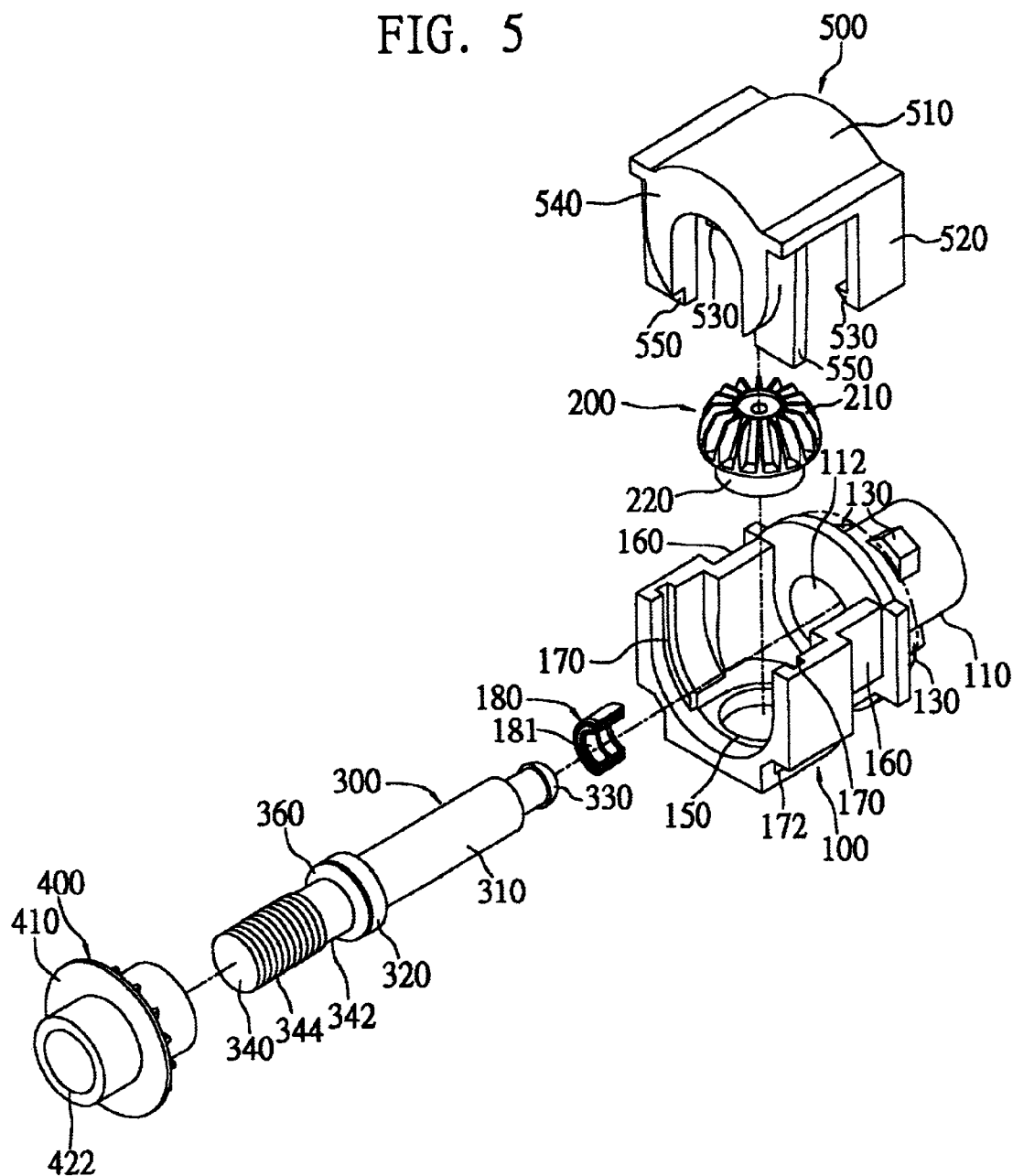
FIG. 5 is a dissecting perspective view of the orientation-adjusting device for a vehicle head light of the present invention in the present invention.
Figure 6A:
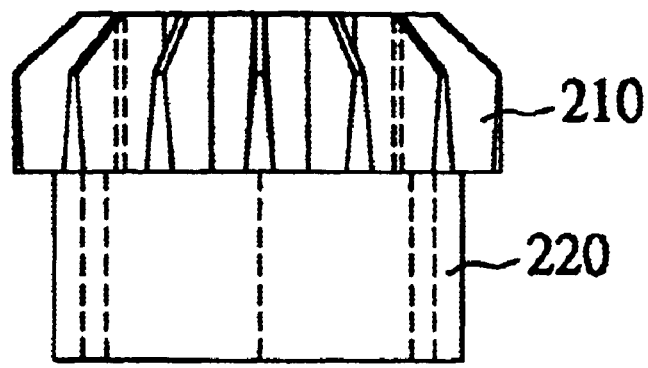
FIG. 6A is a front view of the active unit of FIG. 5.
Figure 6B:
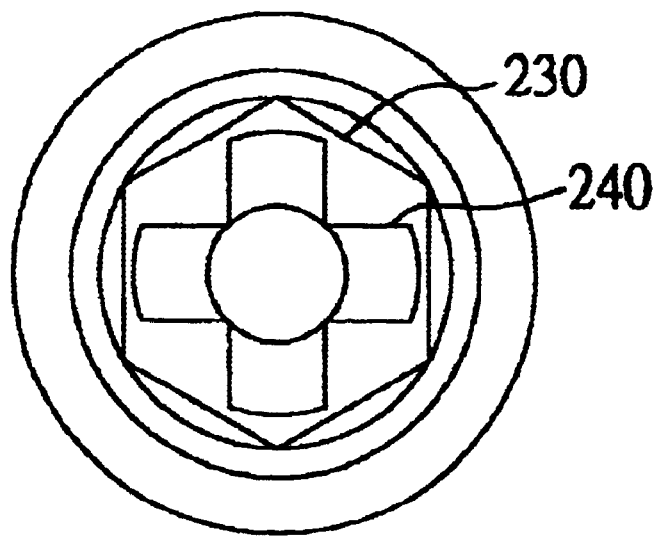
FIG. 6B is an vertical view of the active unit of FIG. 5.

With reference to FIGS. 3 to 5, the housing encasement 100 is opened upwards and to the rear, with a forward protruded cylindrical portion 110 installed at the front surface thereof. The cylindrical portion 110 is formed with a hole 112 at the center thereof, an elastic pad 120 is near the lower end at the external portion thereof (referring to FIGS. 3 and 4), and a plurality of buckling protrusions 130 (three are shown in this embodiment) are installed at equal intervals near the elastic pad 120 at the outer surface thereof.

An elliptic hole 114 penetrating through the front portion so as to communicate with the hole 112 is installed at the front portion of the housing encasement 100, which includes the cylindrical portion 110. A rubber sealing drum 180 is embedded in the bottom of the hole 112 near the elliptic hole 114. The center of the rubber sealing drum 180 has an elliptic hole 181 having an shape identical to that of the elliptic hole 114. In this embodiment, the central axis of an elliptic hole 114 is positioned vertical to the center axis of the axial hole 150 at the bottom of the housing encasement 100. Further, two sides of the housing encasement 100 are symmetrically installed with a groove 160 at the front outer side and an embedded groove 170 at the rear inner side. The distal end of the embedded groove 170 is formed with an embedded hole 172 penetrating the housing encasement 100.

The active unit 200 has a gear portion 210 (in this embodiment, the gear is a tilt gear) and a protruding shaft portion 220 protruding from the gear portion 210. The protruding shaft portion 220 is rotationally and axially installed at the axial hole 150 of the housing encasement 100. The active unit 200 is further installed with a groove 230 on the end surface of the protruding shaft portion 220, operated by an opener. In this embodiment, the groove 230 has a hexagonal shape and is installed with a cruciform recess 240 at the bottom thereof.

The driven screw rod 300 is formed with a circular protrusion 320 approximately at the middle section thereof. The front section in front of the circular protrusion 320 includes an elliptical cross section 310, and a buckle 330 with an approximate semicircular shape formed at the extreme front end of the elliptical cross section 310 with a gradually reduced diameter from the distal end. The driven screw rod 300 is installed at a rear section 340 at the rear side of the circular protrusion 320, and includes the rear threaded section 344 at the rear end thereof, and a cylindrical section 342 installed between the threaded section 344 and the circular protrusion 320. With reference to FIGS. 3 and 4, the elliptical cross section 310 is inserted into the elliptical hole 181 of the rubber sealing drum 180 and the housing encasement 100 so that it is able to slide therein. Besides, the diameter of the cylindrical section 342 is slightly smaller than that of the root portion of the thread on the threaded section 344, and the root portion of the cylindrical section 342 near the circular protrusion 320 has an elastic O ring 360.

The driven unit 400 is a cylindrical body with a gear portion 410 (in this embodiment, it is a tilt gear). The axial center thereof is installed with a penetrating hole formed by a hole 422 and a threaded hole 424. Referring to FIG. 3, the diameter of the hole 422 is slightly larger than that of the root portion of the thread on the threaded hole 424, and is slightly larger than the diameter of the tip portion of the thread on the threaded portion 344. The diameter of the tip of the thread in the threaded hole 424 is slightly larger than that of the cylindrical section 342.

The cover 500 serves to cover a horizontal portion 510 above the housing encasement 100 so as to be formed as an upper cambered shape without any interaction with the gear portion 410 of the driven unit 400. Two sides of the front end of the horizontal portion 510 are formed with hook arms 520, which are symmetrical to one another. These hook arms 520 are conformed to the groove 160 of the housing encasement 100, and the hooks 530 at lower ends thereof can be used to buckle the lower edges of the groove 160. The rear portion of the cover 500 for covering a vertical portion 540 at the rear side of the housing encasement 100 has a reverse U shape so as not to interact with the driven unit 400. An embedded convex portion 550 extending outwards and downwards is formed at the outer edge of the vertical portion 540 at the face facing toward the hook arm 520. The outward-extended portion of the embedded convex portion 550 can be embedded into an embedded groove 170, while the downward-extending portion can be embedded into the embedded hole 172. Therefore, by using the aforesaid hook arm 520 and embedded convex portion 550, the cover 500 and the housing encasement 100 can be engaged tightly without any screw.

Other than having a function of preventing the driven unit 400 from separating from the housing encasement 100, the cover 500 may be used to assure the engagement of the gear portion 210 of the active unit 200 with the gear portion 410 of the driven unit 400, because the embedded convex portion 550 has an outward extending portion embedded in the embedded groove 170 which can effectively stop the driver unit 400 from moving backwards.

Figure 7A:
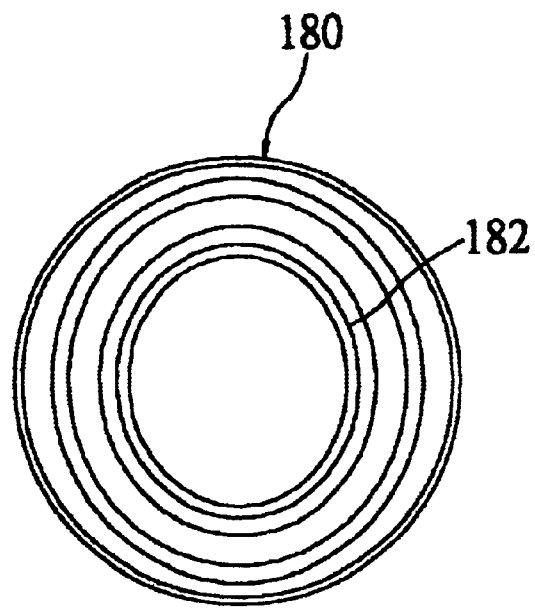
FIG. 7A is a lateral view of the rubber sealing drum of FIG. 5.
Figure 7B:
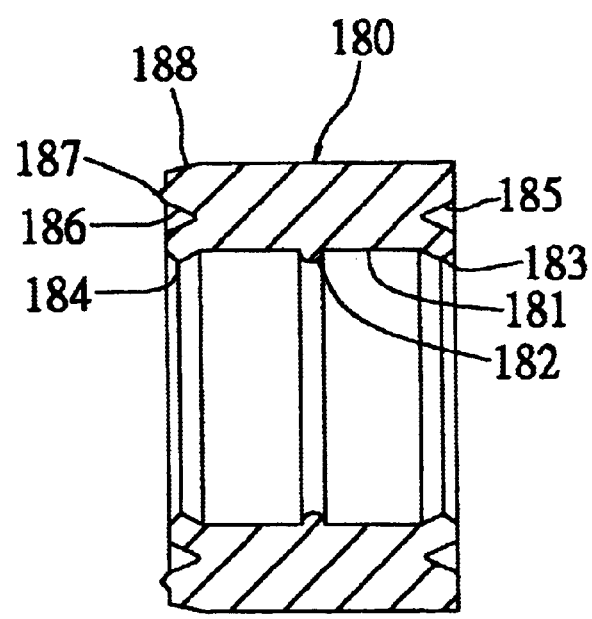
FIG. 7B is a cross sectional view of the rubber sealing drum of FIG. 5.

With reference to FIG. 7A, a lateral view of the rubber sealing drum 180 shown in FIG. 5 is illustrated. FIG. 7B is a sectional view of the rubber sealing drum 180 of FIG. 5. As shown in the figures, the center of the rubber sealing drum 180 has an elliptical hole 181. A semicircular sealing ring 182 protrudes from an inner peripheral surface near the center of the elliptical hole 180. Near the two ends thereof, there are protruding sealing rings 183 and 184 are protruded with a triangular cross section respectively. Moreover, two end surfaces of the rubber sealing drum 180 are formed with grooves 185 and 186. Furthermore, a sealing ring 187 protrudes on the outer periphery of the groove 186 formed at the end surface. Furthermore, at the interface between the end surface formed with the groove 186 and the outer periphery of the rubber sealing drum 180, a tilt surface 188 is formed.

The tilt surface 188 formed at one end surface of the rubber sealing drum 180 enables the end formed with the tilt surface 188 to be easily inserted into the hole 112 of the housing encasement 100. The rubber sealing drum 180 inserted in the hole 112 is finally embedded in the bottom surface 113 of the hole 112 near the elliptical hole 114. The sealing ring 187 resists against the bottom surface 113. Furthermore, when the elliptical cross section 310 of the driven screw rod 300 passes through the elliptical hole 181 of the rubber sealing drum 180, the sealing rings 182, 183, and 184 resist against the surface of the elliptical cross section 310.

The installation and operation of the orientation-adjusting device for a vehicle head light according to the present invention are described in the following with the appended drawings FIGS. 1 to 4.

The method of installation for the orientation-adjusting device for a vehicle head light according to the present invention is identical to that disclosed in Chinese Patent Application No. 89214252. Namely, the cylindrical portion 110 in the front end of the housing encasement 100 is aimed at the installing hole 912 at the back side of the housing encasement 910 of the lamp assembly 900 (the buckling protrusion 130 of the cylindrical portion 110 is aimed at the notch corresponding to the edge of the installing hole 912) and inserted therein. Then it is rotated after slightly pressing the elastic pad 120 at the root portion of the cylindrical portion 110. Therefore, the orientation adjuster of the present invention can be tightly fixed to the lamp assembly 900. Moreover, as the cylindrical portion 110 is inserted into the installing hole 912, the buckle 330 at the front end of the driven screw rod 300 is pressed to pass through the buckling hole 924 of a reflecting mask 922, so that the driven screw rod 300 is connected to the reflecting mask 922.

When the orientation adjuster of the present invention is assembled to the lamp assembly 900 of a car according to the foregoing method, since the sealing ring 187 of the rubber sealing drum 180 resists against the bottom surface 113, and the sealing rings 182, 183, and 184 resists against the surface of the elliptical cross section 310, the vapor will be prevented from flowing through the slit between the hole 113 and the rubber sealing drum 180 and through the slit between the elliptical cross section 310 and the rubber sealing drum 180.

The operating method of the orientation adjuster of the present invention will be described herein. Referring to FIGS. 3 and 4, an opener or a hexagonal spanner is inserted into a groove 230 at the end surface of the active unit 200 (referring to FIG. 6) and is rotated. By engaging the active unit 200 and the tilt gear between the active unit and the driven unit 400, the driven unit 400 rotates in a space formed by the housing encasement 100 and the cover 500. The driven unit 400 only rotates without moving, while the driven screw rod 300 only moves axially without rotationing (because the front end thereof is an elliptical cross section 310 passing through the elliptical hole 114). Therefore, the driven screw rod 300, which is connected to the threaded hole 424 of the driven unit 400 by screw through the threaded section 344, drive the reflecting mask 922 for adjusting the projecting angle of the main lamp 920 due to the rotation of the driven unit 400 into or out of the housing encasement 100 (according to the rotation direction of the active unit 200).

When the orientation adjuster of the present invention is operated in the aforementioned way, since two end surfaces of the rubber sealing drum 180 are formed with grooves 185 and 186. Therefore, when the driven screw rod 300 is rotated out with respect to the housing encasement 100, the portion between the groove 185 and the sealing ring 183 will be driven to face inwards, so that the sealing ring 183 will tightly adhere to the surface of the elliptical cross section 310. Similarly, when the driven screw rod 300 is rotated into the housing encasement 100, the sealing ring 184 will tightly adhere to the surface of the elliptical cross section 310. Therefore, in adjusting the operation of the orientation adjuster of the present invention, the rubber sealing drum 180 may prevent vapor from entering into the interior of the lamp assembly 900.

Besides, since the rubber sealing drum 180 is in contact with the driven screw rod 300 in a small area by the three sealing rings 183, when the active unit 200 is rotated to make the driven screw rod 300 move forwards or backwards, the prevailing torque for continuously rotating the active unit 200 is almost constant without any vibrations.

Further, since the driven screw rod 300 is installed with a threadless cylindrical section 342 between the circular protrusion 320 and the threaded section 344, the rod portion of the cylindrical section 342 near the circular protrusion 320 is installed with an O-shaped ring 360, and the axial center of the driven unit 400 is installed with a hole 422 without thread, when the active unit 200 is rotated continuously so that the driven screw rod 300 retracts into the position illustrated in FIG. 3, the threaded section 344 of the driven screw rod 300 will separate from the threaded hole 424 of the driven unit 400. Meanwhile, the end surface of the driven unit 400 until mildly compress the O-shaped ring 360. At this time, even though the active unit 200 is rotated continuously, the driven screw rod 300 cannot retract any further. Therefore, as over-rotation will not be allowed so as to damage the cover 500, the reflecting mask of the car lamp will not be damaged due to the over-retraction of the driven screw rod 300. While at this time, since the O-shaped ring is compressed so as to provide a restoring force, as a result, a reverse rotation will induce the threaded section 344 to be re-screwed to the thread hole 424 by screw via the restoring force so as to cause the driven screw rod 300 to protrude out.

Similarly, the driven screw rod 300, is installed with a threadless cylindrical section 342 between the circular protrusion 320 and the threaded section 344, the axial center of the driven unit 400 is installed with a threadless hole 422, and a rubber sealing drum 180 is installed near the bottom of the hole 112 near the elliptical hole 114 of the housing encasement 100. As a result, when the active unit 200 is rotated continuously so that the driven screw rod 300 protrudes to a position illustrated in FIG. 4, the threaded section 344 of the driven screw rod 300 will separate from the threaded hole 424 of the driven unit 400. Meanwhile, the end surface of the circular protrusion 320 will slightly compress the rubber sealing drum 180. At this time, even when the active unit 200 is rotated continuously, the driven screw rod 300 can not protrude out any further. Therefore, as the circular protrusion 320 of the driven screw rod 300 will not be damaged due to over-rotation and consequently, the reflecting mask of the car lamp will not be damaged due to the driven screw rod 300 being over-inserted therein. At the same time, since the rubber sealing drum 180 will provide a restoring force because of being compressed, a reverse rotation will cause the threaded section 344 to be re-screwed to the threaded hole 424 by the restoring force that the driven screw rod 300 retracts again.

Further, since the threaded section 344 can be separated from the threaded hole 424 as described above, length of the threaded section 344 can be approximately equal to the moving length of the driven screw rod 300, so that the length of the driven screw rod 300 may be reduced. Consequently, the volume of the orientation adjuster according to the present invention is decreased.

Furthermore, in the present invention, the rubber sealing drum 180 for sealing is installed in the housing encasement 100, so that it is hard to be directly exposed to a high temperature in the lamp assembly 900, and thus it has a longer lifetime.

The present invention has been described using the foregoing exemplary preferred embodiments. All modifications and variations of equal functions without violating the principle and technology of the present invention should be included in the scope of the claims to be described below.

What is claimed is:

1. An orientation-adjusting device for a vehicle illuminator, said device comprising:

a housing encasement having an elliptical hole and an axial hole;

an active unit having an axial portion axially installed in the axial hole, and a gear portion located in the housing encasement;

a driven unit having another gear portion engaged with the gear portion of the active unit, and a through hole including a threaded hole section relatively close to the active unit and a threadless hole section further away from the active unit;

a cover installed on the housing encasement for covering the interior of the housing encasement and for preventing the driven unit from projecting beyond the housing encasement;

a driven screw rod having at one end a threaded section for engaging the threaded hole section of the driven unit; and having another end with an elliptical cross section protruding out of the elliptical hole of the housing encasement to be connected with the vehicle illuminator, a root portion of the elliptical cross section having a circular protrusion, and an unthreaded cylindrical section being provided between the circular protrusion and the threaded section;

an elastic unit installed between the circular protrusion of the driven screw rod and the driven unit, whereby, when the active unit is over-rotated in one direction, the driven screw rod is uncoupled from the driven unit and due to the threaded hole section of the driven unit being completely moved to the threadless cylindrical section of the driven screw rod and the threaded section of the driven screw rod being completely moved to the threadless hole section of the driven unit and the elastic unit provides an elastic force for re-screwing the threaded section of the driven screw rod to the threaded hole section of the driven unit as the active unit is rotated in a reverse direction; and an elastic sealing unit installed between the circular protrusion of the driven screw rod and the elliptical hole of the housing encasement for preventing gas from passing through the elliptical hole, whereby when the active unit is over-rotated in said another direction, the threaded section of the driven screw rod is uncoupled from the threaded hole section of the driven unit so as to prevent further movement of the driven screw rod, and the elastic sealing unit provides an elastic force for reengaging the threaded section of the driven screw rod with the threaded hole section of the driven unit as the active unit is rotated in a reverse direction.

2. The orientation-adjusting device of claim 1, wherein the elastic unit is an O-shaped ring enclosing the cylindrical section near a root portion of the circular protrusion.

3. The orientation-adjusting device of claim 1, wherein:
the housing encasement is opened at a rear portion and an upper portion, a front side of the housing encasement having a forward protruded cylindrical portion and the elliptical hole being at an end of the cylindrical portion, and the center of the cylindrical portion has a hole connecting to the elliptical hole.

4. The orientation-adjusting device of claim 1, wherein:
the elastic sealing unit is a rubber sealing drum embedded in the bottom of the elliptical hole of the housing encasement, and the center of the rubber sealing drum has an elliptical aperture;

an inner peripheral surface of the elliptical aperture hear the center has a protruded semicircular sealing ring and protruded sealing rings each of a triangular cross section are formed near two ends of the elliptical aperture respectively; and two end surfaces of the rubber sealing drum each have a groove, and a sealing ring protrudes at the outer periphery of the groove on the end surface facing the elliptical hole of the housing encasement.

5. The orientation-adjusting device of claim 1, wherein the active unit is axially installed to the axial hole in the housing encasement by a protruding shaft protruding from the gear portion of the active unit, and an end surface of the protruding shaft is provided with a groove operably by an opener.

6. The orientation-adjusting device of claim 5, wherein the groove has a hexagonal shape with a cruciform recess at a bottom surface thereof.

7. The orientation-adjusting device of claim 1, wherein the elliptical hole is perpendicular to a central axis of the axial hole.

8. The orientation-adjusting device of claim 1, wherein the gear portions of the active units and of the driven unit are bevel gears.

9. The orientation-adjusting device of claim 1, wherein the cover is buckled to the housing encasement and fixed thereon.

10. The orientation-adjusting device of claim 9, wherein:
the housing encasement has a bottom, two lateral sides upright from two sides of the bottom, and a unit opened at a front side and a rear side formed by a cylindrical portion protruding from a front edge of the bottom and the two lateral sides;

the two lateral sides are symmetrically formed with a concave portion at an outer side of a front end thereof and an embedding groove at an inner rear side thereof;

the cover has a horizontal portion covering a top side of the housing encasement and a vertical portion covering the rear side of the housing encasement; and two sides at a front end of the horizontal portion are symmetrically provided with two hook arms, each of which corresponds to the concave portion of the housing encasement and has a hook at a lower end thereof for buckling a lower edge of the concave portion.

11. The orientation-adjusting device of claim 10, further comprising an embedded convex portion extending outwards and downwards at each of two lateral edges of the vertical portion of the cover, whereby, as the cover covers the housing encasement, the embedded convex portions are embedded in the embedding grooves on the two lateral sides of the housing encasement.

* * * * *

UNITED STATES PATENT AND TRADEMARK OFFICE
CERTIFICATE OF CORRECTION

PATENT NO. : 6,619,809 B2  Page 1 of 1
APPLICATION NO. : 09/974867
DATED : September 16, 2003
INVENTOR(S) : Chiang It is certified that error appears in the above-identified patent and that said Letters Patent is hereby corrected as shown below:

On The Title Page, Item (75)

"Inventor:  Zu-Yu Chiang"

should be replaced by:

-- Inventor:  Tzyy-Yu Chiang --

Signed and Sealed this

Eleventh Day of March, 2008

JON W. DUDAS
*Director of the United States Patent and Trademark Office*